United States Patent
Zhou et al.

(10) Patent No.: US 11,832,212 B2
(45) Date of Patent: Nov. 28, 2023

(54) POSITIONING IN RRC IDLE AND INACTIVE STATES (71) Applicant: Samsung Electronics Co., Ltd., Suwon-si (KR)

(72) Inventors: Yuhan Zhou, San Diego, CA (US); Jung Hyun Bae, San Diego, CA (US); Jungwon Lee, San Diego, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 38 days.

(21) Appl. No.: 17/355,035

(22) Filed: Jun. 22, 2021

(65) Prior Publication Data

US 2022/0030544 A1 Jan. 27, 2022

Related U.S. Application Data (60) Provisional application No. 63/076,548, filed on Sep. 10, 2020, provisional application No. 63/063,787, filed on Aug. 10, 2020, provisional application No. 63/057,234, filed on Jul. 27, 2020.

(51) Int. Cl.
*H04W 64/00* (2009.01)
*H04W 74/08* (2009.01)
*H04W 76/27* (2018.01)
*H04L 5/00* (2006.01)
*H04L 25/02* (2006.01)

(52) U.S. Cl.
CPC ......... *H04W 64/006* (2013.01); *H04L 5/0051* (2013.01); *H04L 25/0226* (2013.01); *H04W 74/0833* (2013.01); *H04W 76/27* (2018.02)

(58) Field of Classification Search
None
See application file for complete search history.

(56) References Cited

U.S. PATENT DOCUMENTS

| | | | |
|---|---|---|---|
| 10,623,909 B2* | 4/2020 | Sosnin | G01S 13/876 |
| 10,873,929 B2* | 12/2020 | Kim | H04W 72/51 |
| 11,424,966 B2* | 8/2022 | Manolakos | H04W 64/00 |
| 2013/0083683 A1* | 4/2013 | Hwang | H04W 64/00 370/252 |
| 2020/0107304 A1* | 4/2020 | Wang | H04L 5/0092 |
| 2020/0112867 A1* | 4/2020 | Opshaug | H04L 43/0864 |
| 2020/0137715 A1* | 4/2020 | Edge | H04L 43/0864 |

(Continued)

FOREIGN PATENT DOCUMENTS

| | | |
|---|---|---|
| CN | 112437495 A | 3/2021 |
| WO | WO 2020/083190 A1 | 4/2020 |

(Continued)

*Primary Examiner* — Faiyazkhan Ghafoerkhan
(74) *Attorney, Agent, or Firm* — Lewis Roca Rothgerber Christie LLP (57) ABSTRACT

A system and method for positioning in RRC Idle and Inactive states. In some embodiments, the method includes receiving, by a user equipment (UE), in Idle or Inactive state, a downlink positioning reference signal (PRS); transmitting, by the UE, in Idle or Inactive state, an uplink reference signal; and transmitting, by the UE, in Idle or Inactive state, a PUSCH carrying an estimate of the position of the UE. The uplink reference signal may be a positioning sounding reference signal (SRS), or a Physical Random Access Channel (PRACH) preamble with sequence length greater than 1151.

13 Claims, 8 Drawing Sheets

(56) References Cited

U.S. PATENT DOCUMENTS

| | | | | |
|---|---|---|---|---|
| 2020/0245372 A1* | 7/2020 | Lei | .................... | H04L 27/2602 |
| 2020/0267774 A1* | 8/2020 | Vos | .................. | H04W 74/0833 |
| 2020/0313816 A1* | 10/2020 | Sun | .................. | H04W 74/0808 |
| 2020/0329503 A1* | 10/2020 | Da Silva | ........... | H04W 36/0055 |
| 2021/0120581 A1* | 4/2021 | Kim | .................... | H04W 76/27 |
| 2021/0176095 A1* | 6/2021 | Manolakos | ........... | H04L 5/0051 |
| 2021/0219350 A1* | 7/2021 | Wu | ...................... | H04L 69/324 |
| 2021/0385766 A1* | 12/2021 | Manolakos | ........... | G01S 5/0236 |
| 2021/0391972 A1* | 12/2021 | Mun | .................... | H04L 25/023 |
| 2021/0400734 A1* | 12/2021 | Zhang | .................. | H04L 5/0048 |
| 2022/0030544 A1* | 1/2022 | Zhou | ................ | H04W 74/0833 |
| 2022/0110085 A1* | 4/2022 | Khoryaev | ............. | H04L 5/0051 |
| 2022/0150832 A1* | 5/2022 | Yang | .................... | H04W 72/23 |
| 2022/0201721 A1* | 6/2022 | Yang | .................... | H04W 72/23 |
| 2022/0217774 A1* | 7/2022 | Kim | .................... | H04L 5/0007 |
| 2022/0225462 A1* | 7/2022 | Manolakos | ........... | H04L 5/0051 |
| 2022/0236366 A1* | 7/2022 | Cha | .................. | H04W 72/0453 |
| 2022/0264603 A1* | 8/2022 | Yang | .................... | H04L 1/1819 |
| 2023/0043012 A1* | 2/2023 | Huang | ............... | H04W 74/008 |
| 2023/0044554 A1* | 2/2023 | Huang | ................. | H04L 5/0053 |

FOREIGN PATENT DOCUMENTS

| | | |
|---|---|---|
| WO | WO 2020/144326 A1 | 7/2020 |
| WO | WO 2020/159339 A1 | 8/2020 |
| WO | WO 2020/198202 A1 | 10/2020 |
| WO | WO 2020/222519 A1 | 11/2020 |
| WO | WO 2020/222619 A1 | 11/2020 |
| WO | WO 2020/248792 A1 | 12/2020 |
| WO | WO 2021/040501 A1 | 3/2021 |

* cited by examiner

| SCS (kHz) | Max PRS bandwidth (number of RB) | Max PRS bandwidth (MHz) |
|---|---|---|
| 15 | 268 | 48.24 |
| 30 | 272 | 97.92 |
| 60 (FR1) | 132 | 95.04 |
| 60 (FR2) | 264 | 190.08 |
| 120 | 264 | 380.16 |

FIG. 4A

Table 6.3.3.2-1: Supported combinations of $\Delta f^{RA}$ and $\Delta f$, and the corresponding value of $\bar{k}$.

| $L_{RA}$ | $\Delta f^{RA}$ for PRACH | $\Delta f$ for PUSCH | $N_{RB}^{RA}$, allocation expressed in number of RBs for PUSCH | $\bar{k}$ |
|---|---|---|---|---|
| 839 | 1.25 | 15 | 6 | 7 |
| 839 | 1.25 | 30 | 3 | 1 |
| 839 | 1.25 | 60 | 2 | 133 |
| 839 | 5 | 15 | 24 | 12 |
| 839 | 5 | 30 | 12 | 10 |
| 839 | 5 | 60 | 6 | 7 |
| 139 | 15 | 15 | 12 | 2 |
| 139 | 15 | 30 | 6 | 2 |
| 139 | 15 | 60 | 3 | 2 |
| 139 | 30 | 15 | 24 | 2 |
| 139 | 30 | 30 | 12 | 2 |
| 139 | 30 | 60 | 6 | 2 |
| 139 | 60 | 60 | 12 | 2 |
| 139 | 60 | 120 | 6 | 2 |
| 139 | 120 | 60 | 24 | 2 |
| 139 | 120 | 120 | 12 | 2 |
| 571 | 30 | 15 | 96 | 2 |
| 571 | 30 | 30 | 48 | 2 |
| 571 | 30 | 60 | 24 | 1 |
| 1151 | 15 | 15 | 96 | 1 |
| 1151 | 15 | 30 | 48 | 1 |
| 1151 | 15 | 60 | 24 | 1 |

FIG. 4B

POSITIONING IN RRC IDLE AND INACTIVE STATES

CROSS-REFERENCE TO RELATED APPLICATION(S)

The present application claims priority to and the benefit of (i) U.S. Provisional Application No. 63/057,234, filed Jul. 27, 2020, entitled "Positioning in RRC Idle and Inactive States", (ii) U.S. Provisional Application No. 63/063,787, filed Aug. 10, 2020, entitled "Positioning in RRC Idle and Inactive States", and (iii) U.S. Provisional Application No. 63/076,548, filed Sep. 10, 2020, entitled "POSITIONING IN RRC IDLE AND INACTIVE STATES", the entire contents of all which are incorporated herein by reference.

FIELD

One or more aspects of embodiments according to the present disclosure relate to positioning, and more particularly to positioning without transitioning to radio resource control (RRC) Connected mode.

BACKGROUND

In a mobile network (e.g., in a 5G network), it may be advantageous to determine the position, or "location" of user equipment (UEs). In some circumstances, this may be performed after the UE transitions to radio resource control (RRC) Connected mode. A transition to radio resource control (RRC) Connected mode may be costly, however, in terms of power consumption in the UE and in terms of network resources. Moreover, the use of RRC Connected mode may increase the latency in positioning.

Thus, there is a need for an improved system and method for determining the position of a UE.

SUMMARY

According to an embodiment of the present disclosure, there is provided a method, including: receiving, by a user equipment (UE), in Idle or Inactive state, a downlink positioning reference signal (PRS); transmitting, by the UE, in Idle or Inactive state, an uplink reference signal; and transmitting, by the UE, in Idle or Inactive state, a PUSCH carrying an estimate of the position of the UE, the uplink reference signal being: a positioning sounding reference signal (SRS), or a Physical Random Access Channel (PRACH) preamble with sequence length greater than 1151.

In some embodiments, the uplink reference signal is a preamble, with a sequence length X satisfying $$X = N_{SC}^{POS} \cdot \left( \frac{\Delta f^{PUSCH}}{M \cdot \Delta f^{RA}} \right),$$

wherein: $N_{SC}^{POS}$ is the number of subcarriers in the SCS for PUSCH that satisfy the Rel-17 positioning accuracy requirement, $\Delta f^{PUSCH}$ is the subcarrier spacing (SCS) for PUSCH transmission, $\Delta f^{RA}$ is the SCS for PRACH transmission, M is equal to the higher-layer parameter msg1-FDM or the higher-layer parameter msgA-RO-FDM, and $$\frac{\Delta f^{PUSCH}}{M \cdot \Delta f^{RA}} \geq 1.$$

In some embodiments, the uplink reference signal is a positioning sounding reference signal (SRS).

In some embodiments, the method further includes: receiving an SRS timing parameter from a network, the SRS timing parameter specifying a number of slots; and transmitting, by the UE, a Physical Uplink Shared Channel (PUSCH), wherein the transmitting of the SRS includes transmitting the SRS in a slot following a last slot of the PUSCH, and separated from the last slot of the PUSCH by the number of slots.

In some embodiments, the method further includes receiving, from a network, by the UE, in Idle or Inactive state, a Positioning Reference Signal, and transmitting, by the UE, in Idle or Inactive state, to the network, a time difference between the receiving, by the UE, of the Positioning Reference Signal and the transmitting, by the UE, of the uplink reference signal.

In some embodiments, the transmitting of the uplink reference signal includes transmitting the uplink reference signal in a random access channel (RACH) MsgA.

In some embodiments, the transmitting of the uplink reference signal includes transmitting the uplink reference signal in a random access channel (RACH) Msg1.

In some embodiments, the method further includes, receiving, by the UE, from a network, before the transmitting of the uplink reference signal, a Physical Random Access Channel configuration index value (PRACH index value), the PRACH index value being reserved for informing the UE of the network being ready to receive the uplink reference signal.

In some embodiments, the method further includes receiving, by the UE, before the transmitting of the uplink reference signal, a paging channel message, the paging channel message including a Long Term Evolution (LTE) Positioning Protocol (LPP) Request Location Information message.

According to an embodiment of the present disclosure, there is provided a system, including: a user equipment (UE), the UE including: a processing circuit; and a radio, the processing circuit being configured to transmit, in Idle or Inactive state, an uplink reference signal, the uplink reference signal being: a positioning sounding reference signal (SRS), or a Physical Random Access Channel (PRACH) preamble with sequence length greater than 1151.

In some embodiments, the uplink reference signal is a preamble.

In some embodiments, the uplink reference signal is a positioning sounding reference signal (SRS).

In some embodiments, the processing circuit is further configured to: receive an SRS timing parameter from a network, the SRS timing parameter specifying a number of slots; and transmit a Physical Uplink Shared Channel (PUSCH), wherein the transmitting of the SRS includes transmitting the SRS in a slot following a last slot of the PUSCH, and separated from the last slot of the PUSCH by the number of slots.

In some embodiments, the processing circuit is further configured to receive, from a network, in Idle or Inactive state, a Positioning Reference Signal, and to transmit, in Idle or Inactive state, to the network, a time difference between the receiving, of the Positioning Reference Signal and the transmitting of the uplink reference signal.

In some embodiments, the transmitting of the uplink reference signal includes transmitting the uplink reference signal in a random access channel (RACH) MsgA.

In some embodiments, the transmitting of the uplink reference signal includes transmitting the uplink reference signal in a random access channel (RACH) Msg1.

In some embodiments, the processing circuit is further configured to receive, from a network, before the transmitting of the uplink reference signal, a set of configuration values for prach-RootSequenceIndex or rootSequenceIndex-BFR, zeroCorrelationZoneConfig, msg1-FrequencyStart, msg1-FDM, and prach-ConfigurationIndex; or a set of configuration values for msgA-PRACH-RootSequenceIndex, msgA-ZeroCorrelationZoneConfig, msgA-RO-FrequencyStart, msgA-RO-FDM, and msgA-PRACH-ConfigurationIndex, the set of configuration values being reserved for informing the UE of the network being ready to receive the uplink reference signal.

In some embodiments, the processing circuit is further configured to receive, before the transmitting of the uplink reference signal, a paging channel message, the paging channel message including a Long Term Evolution (LTE) Positioning Protocol (LPP) Request Location Information message.

According to an embodiment of the present disclosure, there is provided a system, including: a user equipment (UE), the UE including: means for processing; and a radio, the means for processing being configured to transmit, in Idle or Inactive state, an uplink reference signal, the uplink reference signal being: a positioning sounding reference signal (SRS), or a PRACH preamble signal with a sequence length greater than 1151.

In some embodiments, the uplink reference signal is a positioning sounding reference signal.

BRIEF DESCRIPTION OF THE DRAWINGS

These and other features and advantages of the present disclosure will be appreciated and understood with reference to the specification, claims, and appended drawings wherein:

DETAILED DESCRIPTION

The detailed description set forth below in connection with the appended drawings is intended as a description of exemplary embodiments of a system and method for positioning in RRC Idle and Inactive states provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Mobile devices such as mobile telephones may use position information for various purposes. For example, an application running on the mobile device, or User Equipment (UE), may inform the user of the device of the UE's location, or it may inform users of other devices of the UE's location, or it may inform the user of nearby points of interest (e.g., businesses) or of other users who are nearby. In some circumstances such an application may be running while the UE is the RRC Idle state or in the RRC Inactive state. Transitioning to the RRC Connected state (or "RRC Connected mode") to perform a positioning operation may incur significant energy and latency costs; as such, in some embodiments, the UE may perform positioning in the RRC Idle state or in the RRC Inactive state. As used herein, "positioning" means "determining the position" (of a UE). As used herein, the phrase "user equipment" is used as a countable noun even though the noun it contains ("equipment") may not be countable in ordinary English. Similarly, the phrase Downlink Control Information (DCI) is also used as a countable noun. Positioning may be "UE-based" or "UE-assisted". A UE performing UE-based positioning may estimate its own position (e.g., based on a difference between (i) its distance to a first network node (gNB) and (ii) its distance to a second gNB. A network performing UE-assisted positioning may perform, with the assistance of the UE, various timing measurements (as discussed in further detail below), and the results may be transmitted to a location server, which may estimate, from the measurements, the position of the UE.

Figure 1A:
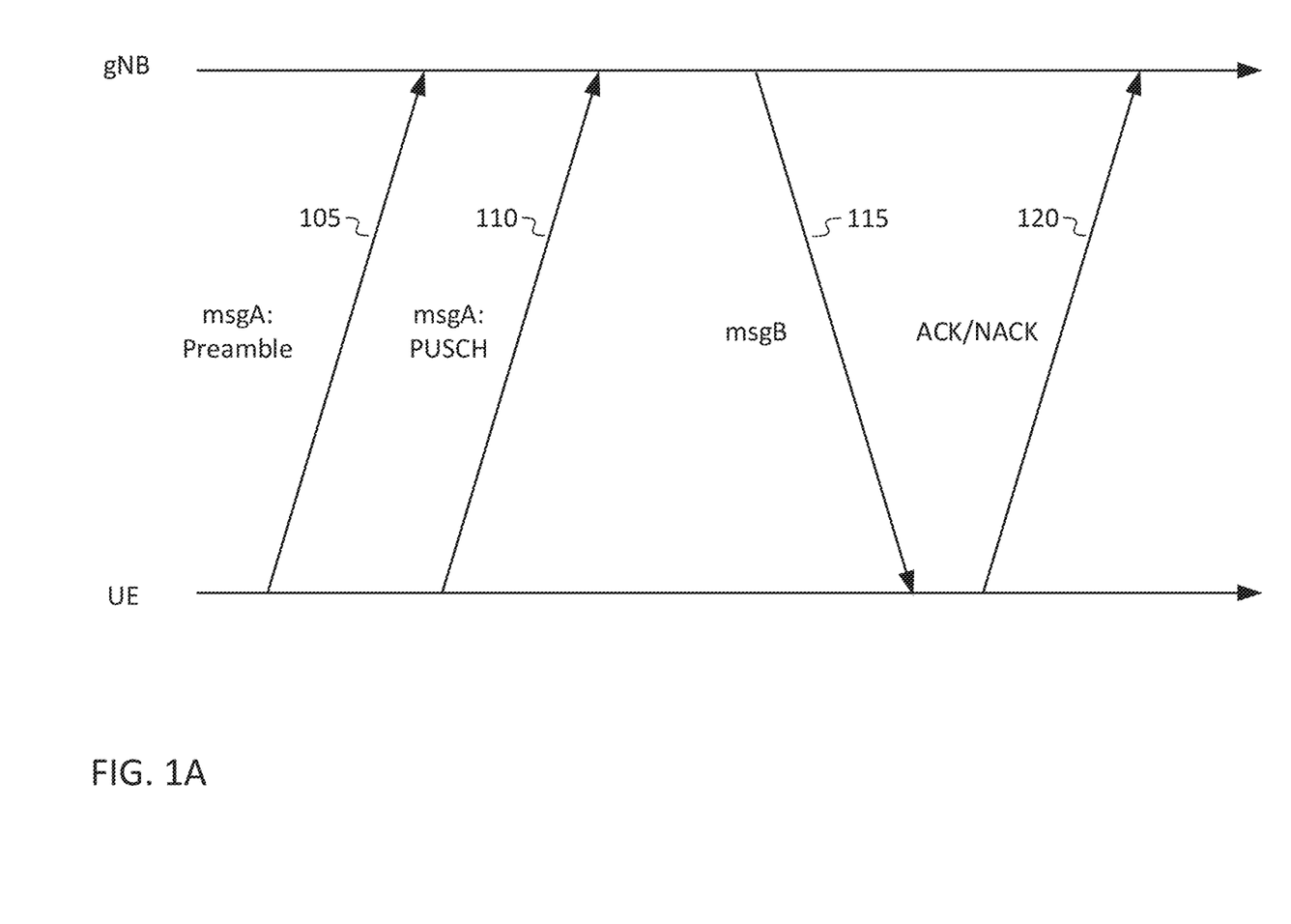
FIG. 1A is a sequence diagram, according to an embodiment of the present disclosure.

In a 5G network, to establish a connection with a serving cell, a UE may utilize a 2-step random access procedure (2-step RACH) or a 4-step RACH procedure. The 2-step RACH procedure is shown in FIG. 1. In this procedure, the UE sends a MsgA including a preamble, at 105, and a Physical Uplink Shared Channel (PUSCH), at 110, to the gNB. The UE chooses one preamble from a pool of possible preambles. Depending on the chosen preamble, the UE then sends MsgA PUSCH on a set of resources which are associated with the chosen preamble. The MsgA PUSCH includes a Contention Resolution ID (CRID). Both transmissions are performed without applying a timing advance (TA) value. The transmission of the preamble and the PUSCH does not occur in the same slot.

Upon the correct reception of both parts of the MsgA, the gNB sends, at 115, a MsgB which includes a random access response (RAR) message to the UE. The RAR message includes a valid TA, and a Temporary Cell Radio Network Temporary Identifier (TC-RNTI) value. In addition, a RAR message can include an uplink grant in case it is a fallback-RAR message; the uplink grant is identical to the one used in Msg2 in 4-step RACH. A UE starts a RAR window timer, during which it monitors a search space for a Downlink Control Information DCI format 1_0 scrambled with MsgB-RNTI scheduling MsgB (the same search space is used for monitoring the DCI for Msg2 in 4-step RACH; the UE distinguishes the two DC's through their respective scrambling codes: RA-RNTI in case of Msg2 and MsgB-RNTI in case of MsgB). If the UE decodes a RAR message indicating its CRID, it sends back, at 120, a HARQ-ACK acknowledging the successful reception of the RAR message.

Figure 1B:
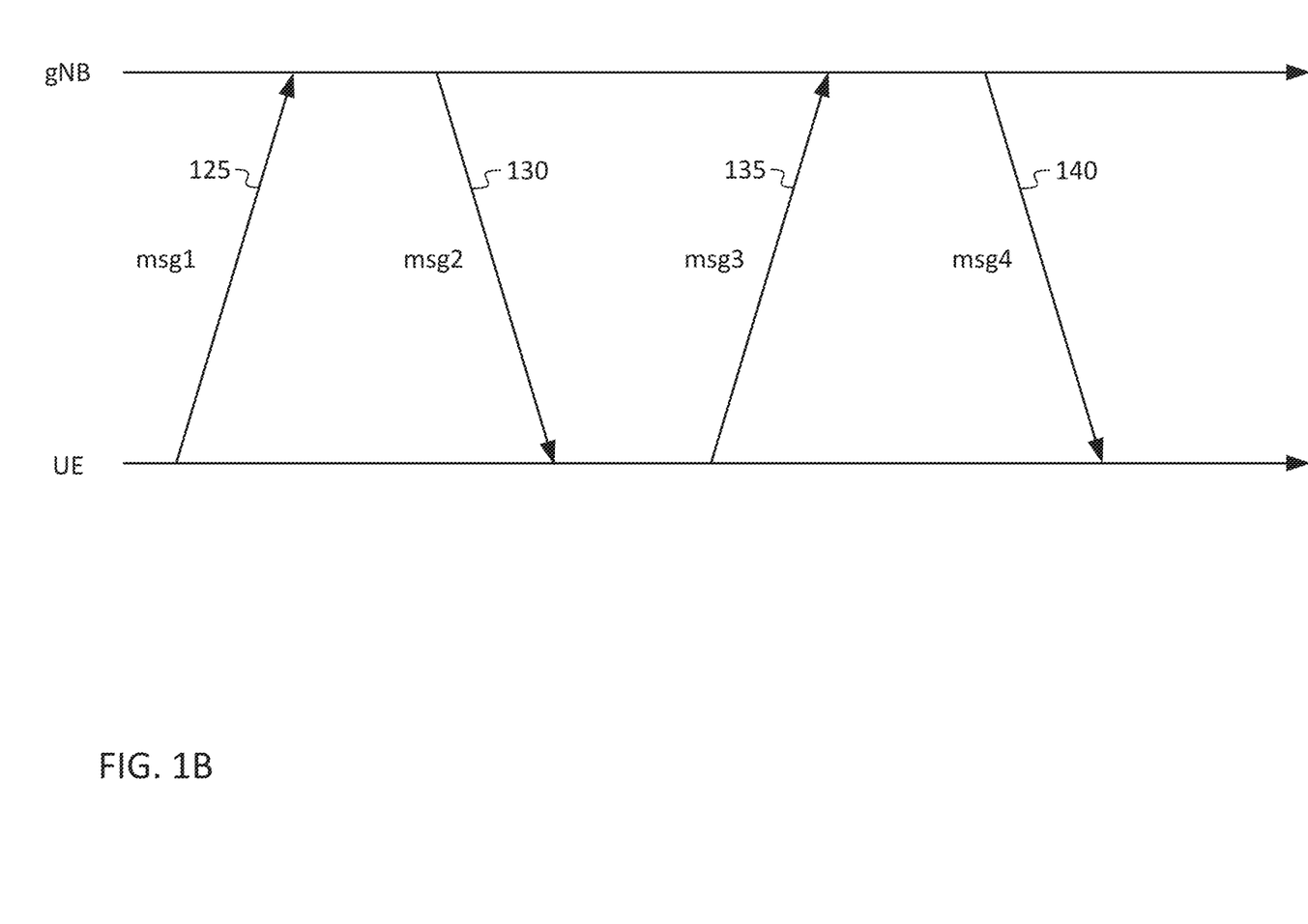
FIG. 1B is a sequence diagram, according to an embodiment of the present disclosure.

As mentioned above, a New Radio (NR) UE may also use a 4-step random-access procedure (4-step RACH) to connect with a network. In the 4-step RACH procedure, the UE transmits, at 125, a Msg1 including a preamble which is referred to as the Physical Random-Access Channel (PRACH). In addition to starting the Radio Resource Control (RRC) connection procedure, Msg1 allows the gNB to make an estimate of the timing advance (TA) value for the UE. Transmission of Msg1 also allows the UE to indicate to the gNB which SSB the UE selected, and therefore establish beam coordination. The gNB sends to each UE a response which is referred to as a Random Access Response (RAR). In this step, the Msg2 is transmitted, at 130, to the UE.

The Msg2 may include (i) the index of the random-access preamble sequences (which may be referred to as RAPID) the network detected and for which the response is valid; (ii) the timing correction calculated by the random-access-preamble receiver; (iii) a scheduling grant, indicating what resources the device should use for the transmission of the message in a third step (Msg3, discussed in further detail below); and a temporary identity, the TC-RNTI, used for further communication between the UE and the network. Upon receiving Msg2, a UE which detects its RAPID transmits, at 135, Msg3 according to the uplink grant delivered to the UE in Msg2. The Msg3 contains a Contention Resolution ID (CRID), a 39-bit random number generated by the UE (if not configured). Transmission of Msg3 is done after applying the TA.

After sending Msg3, possibly from multiple UEs that are in contention, the gNB sends, at 140, Msg4 with the CRID of one UE. All UEs transmitting Msg3 may then attempt to decode a DCI format 1_0 scrambled with TC-RNTI in the same Common Search Space (CSS) used to decode Msg2. This DCI schedules Msg4. The UE which detects its CRID may then consider its RACH procedure as successful, and may promote its TC-RNTI to be its Cell Radio Network Temporary Identifier (C-RNTI). The Msg4 also includes an RRCSetup message, which the UE uses to establish the RRC connection with the gNB. A UE which successfully decodes the Msg4 DCI, detects its CRID, and receives the corresponding PDSCH may then send a HARQ-ACK information.

Figure 2A:
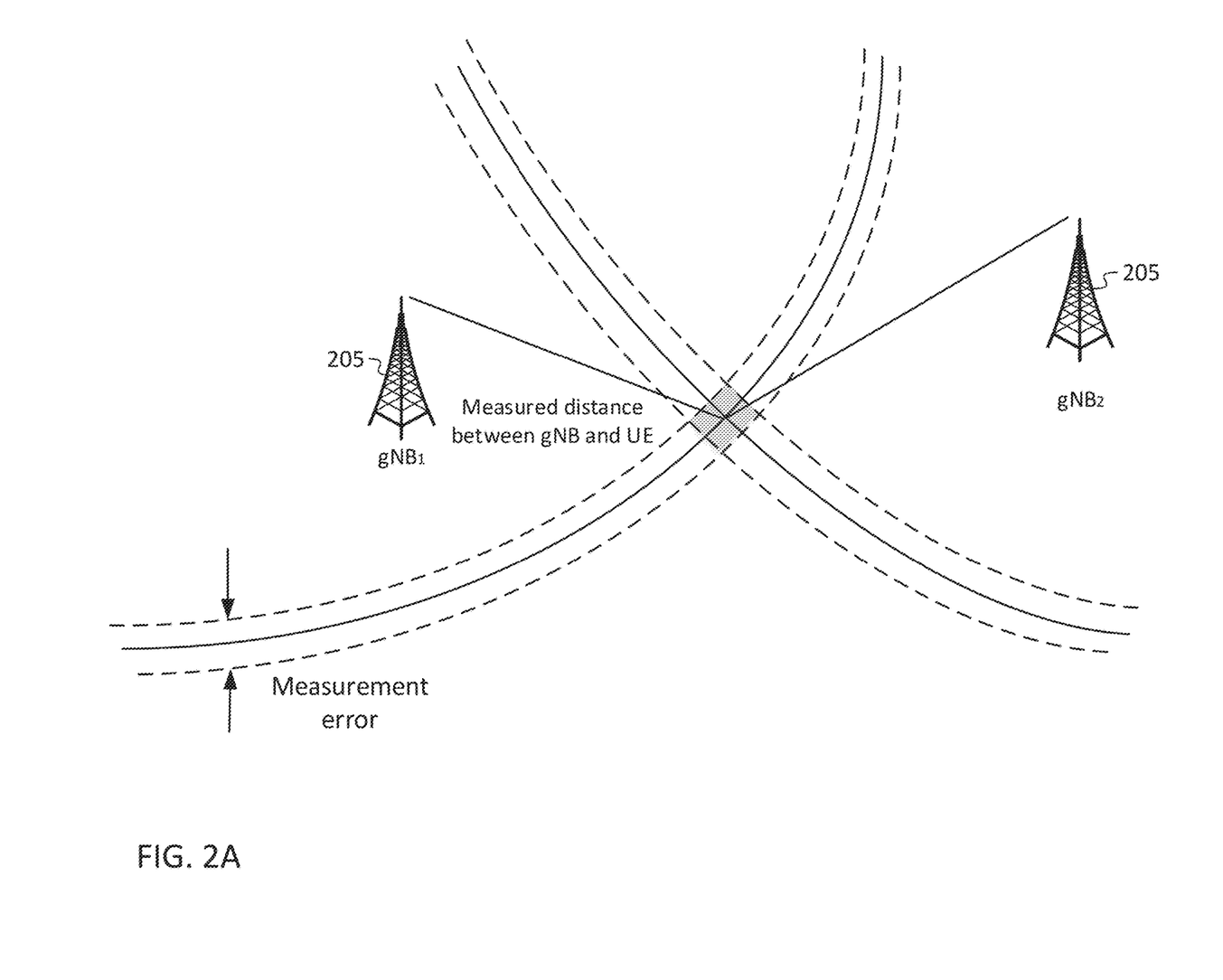
FIG. 2A is schematic diagram of estimation geometry, according to an embodiment of the present disclosure.
Figure 2B:
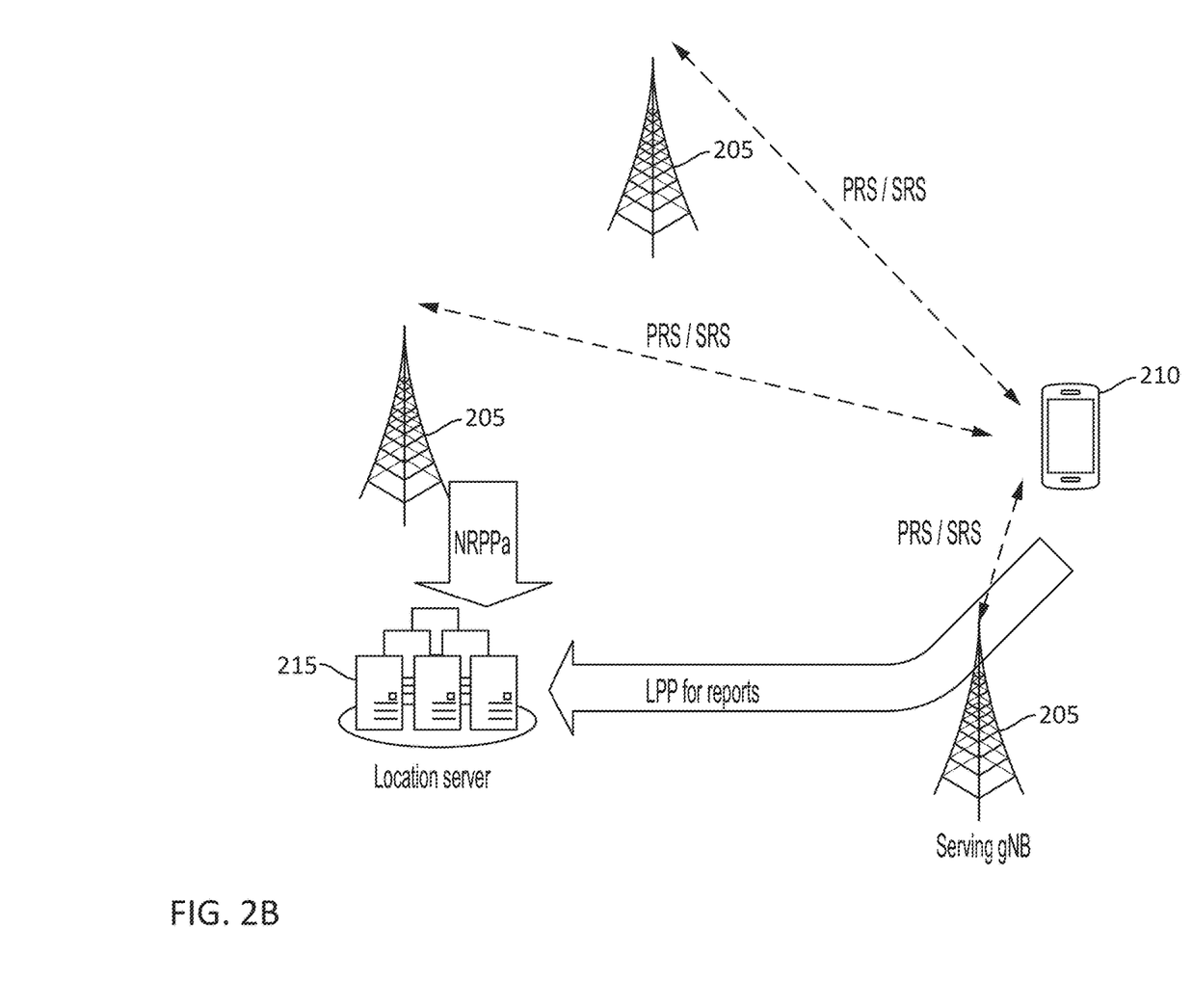
FIG. 2B is schematic diagram of a positioning system, according to an embodiment of the present disclosure.

A multiple-round-trip-time (Multi-RTT) method may be used for positioning. In such a method the UE may exchange signals with each of several gNBs, making it possible for the network to estimate the round-trip time (RTT) between each gNB and the UE (as discussed in further detail below). The distances between the UE and the gNBs are then estimated using the round-trip times. FIG. 2A illustrates how the position of the UE may then be inferred from the positions of the gNBs 205 and the distances between the UE and the gNBs 205. FIG. 2A also illustrates the relationship between uncertainty or errors in the distances, and in the inferred position of the UE. FIG. 2B shows three gNBs 205, a UE 210, and a location server 215. The gNBs may measure the uplink relative time of arrival (RTOA) and receive, from the UE, Rx-Tx time differences (discussed in further detail below), and infer, from this information, the round-trip time between each gNB 205 and the UE 210. The data may be sent to the location server 215 using Long Term Evolution (LTE) Positioning Protocol (LPP) or New Radio Positioning Protocol a (NRPPa).

To perform positioning in the RRC Idle state or in the RRC Inactive state (i.e., without completing the transition to RRC Connected mode), the 2-step or 4-step RACH procedure may be utilized for NR positioning. In some embodiments, a 2-step or 4-step RACH procedure adapted for positioning in the RRC Idle state or in the RRC Inactive state may involve the transmission or reception of reference signals with high bandwidth. Such reference signals may include a downlink positioning reference signal (PRS) or an uplink reference signal such as (i) a modified PRACH preamble format (for high accuracy positioning) or (ii) an uplink Sounding Reference Signal (SRS). As used herein, an "uplink reference signal" is a signal, such as a preamble or an SRS, having a sequence length and being suitable for use by a method for positioning. In some embodiments, positioning related measurement reports may be transmitted by a UE in an RRC Idle or Inactive state. The positioning operation may be performed in two different scenarios: a first scenario in which the UE enters RRC Idle state or the RRC Inactive state from the RRC Connected state, and a second scenario, in which the UE is in the initial access state before a RRC connection is established.

Figure 3A:
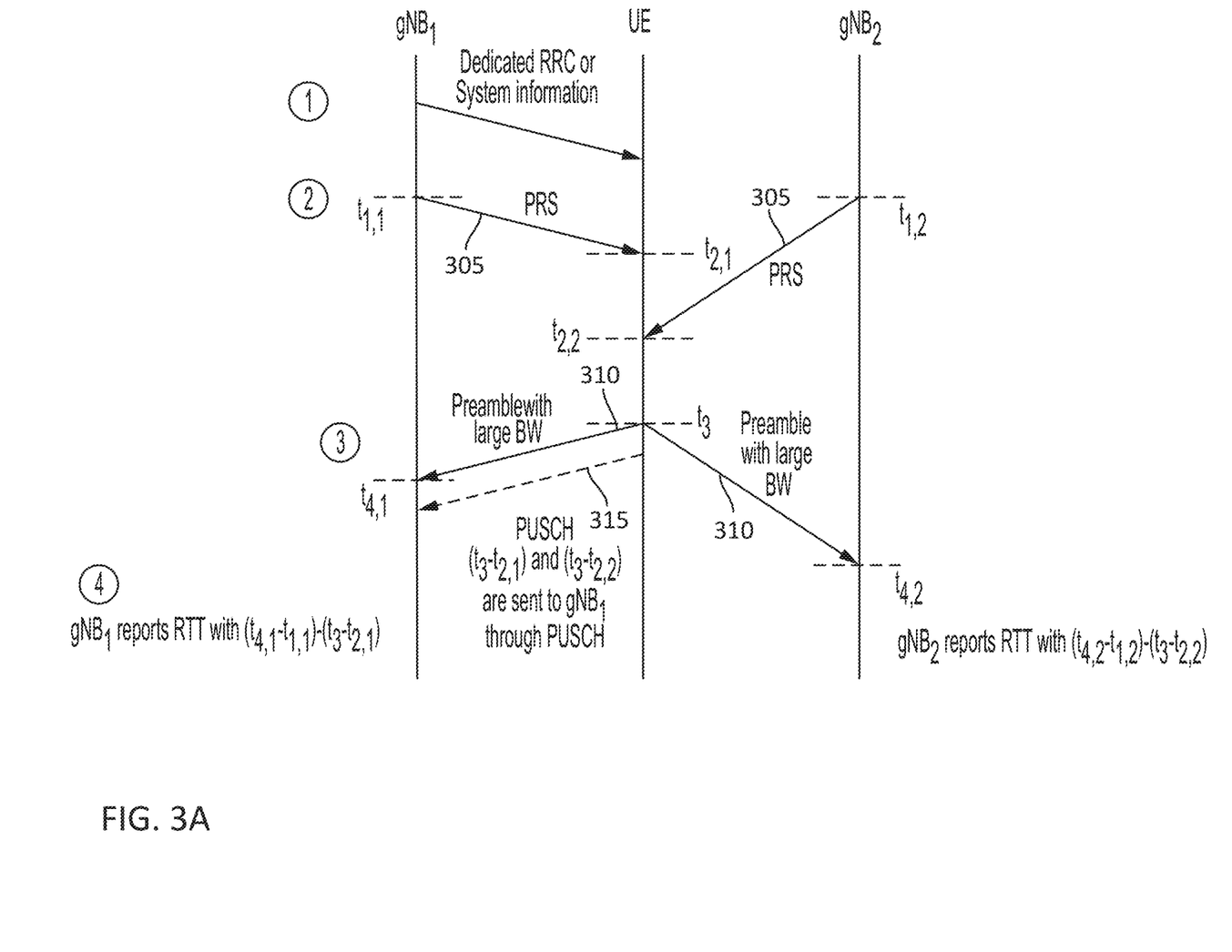
FIG. 3A is a sequence diagram, according to an embodiment of the present disclosure.

FIG. 3A shows one example of a positioning procedure using 2-step RACH. The procedure may include the following steps. In a first step, the PRS and 2-step RACH related parameters are configured by a higher layer. In a second step, multiple gNBs send, at 305, PRS signals to the UE to be located (i.e., positioning of which is to be performed). The location server may configure the PRSs for different gNBs such that the UE can successfully detect the downlink timings (i.e., $t_{2,1}$ $t_{2,2}$ shown in FIG. 3A) for different gNBs. In a third step, the UE sends, at 310, at a time t3, the PRACH preamble to multiple gNBs, and the UE then sends, at 315, the PUSCH to the serving gNB. In some embodiments, the timing signals sent to the gNBs are SRS signals and t3 is the time of the sending of the SRS signal. The PUSCH carries the UE Rx-Tx time differences (e.g., $t_3-t_{2,1}$ and $t_3-t_{2,2}$) corresponding to the multiple gNBs (in this manner, the timing information may be relayed to the network without the need for the UE to transition to RRC Connected mode). In a fourth step, the serving gNB reports the decoded PUSCH content to the location server and all the gNBs also report the Rx-Tx time difference to the location server. The location server may then calculate the position of the UE as discussed above, in the context of FIG. 2A.

In the first step, the PRS may be configured through Positioning System Information Blocks (posSIBs) which are carried in RRC System Information (SI) messages. For example, the IE AssistanceDataSIBelement may be used in the information element (IE) SIBpos which contains the assistance data information for positioning, i.e., assistanceDataElement IE. The IEs otdoa-ReferenceCellInfo and otdoa-NeighbourCellInfo may then be conveyed by IE OTDOA-UE-Assisted in IE assistanceDataElement according to positioning SIB type. Both of the two IEs otdoa-ReferenceCellInfo and otdoa-NeighbourCellInfo contain PRS information, which allows the UE to determine the PRS configuration and schedule.

The RACH parameters can be configured via SI or dedicated RRC signaling. For the first scenario, some positioning related parameters (e.g. RACH parameters) can be configured by the dedicated RRC signaling. For both the first scenario and the second scenario, all the parameters can be configured through SI, i.e., PRS is configured via posSIBs and RACH is configured via SIB1. If a UE is not provided initialDownlinkBWP in SIB1, an initial DL bandwidth part (BWP) is defined by CORESET #0; otherwise, the initial DL BWP is provided by initialDownlinkBWP in SIB1.

Figure 3B:
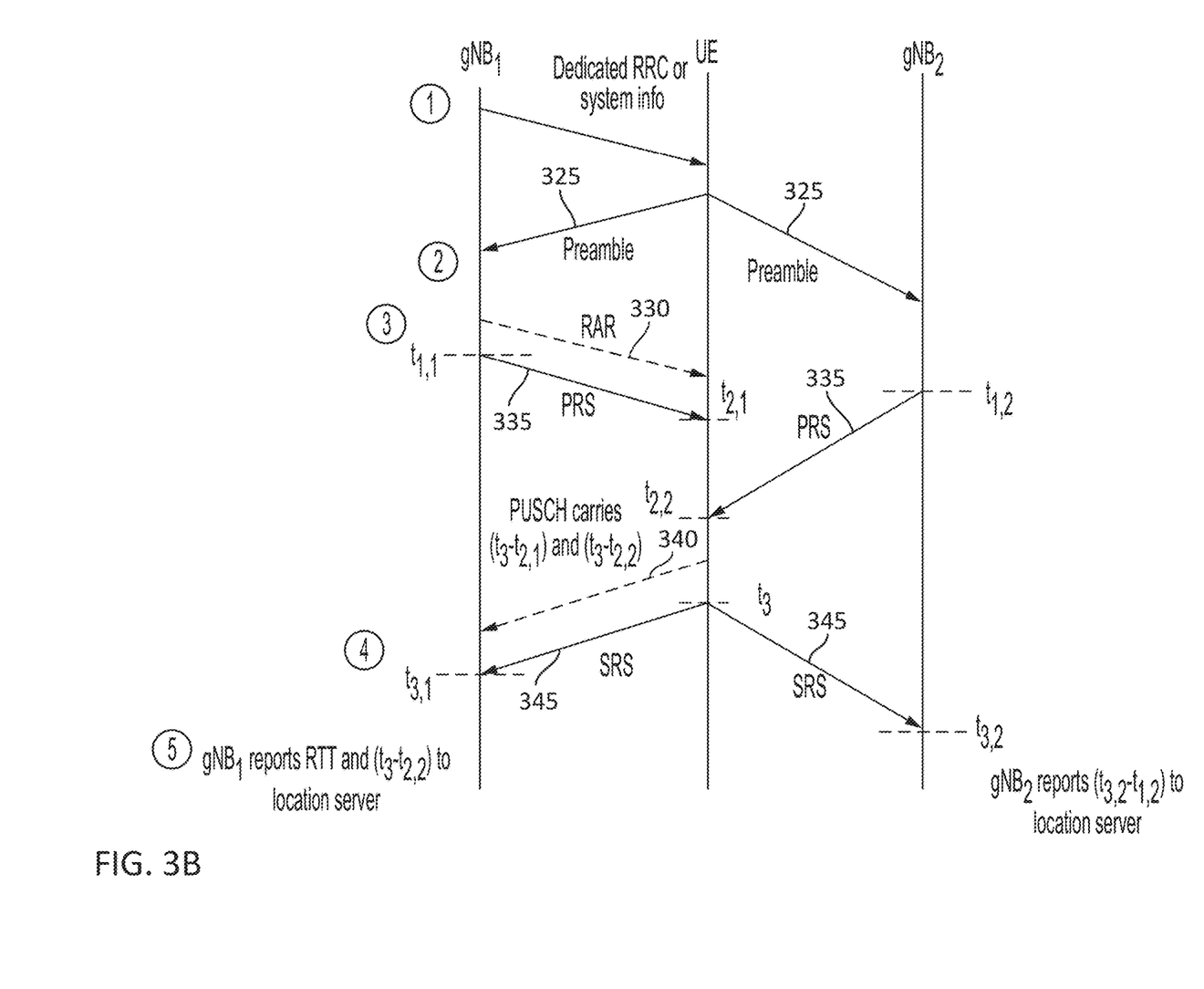
FIG. 3B is a sequence diagram, according to an embodiment of the present disclosure.

The 4-step RACH can also be used for NR positioning, in a manner similar to that of the 2-step RACH, as shown in FIG. 3B. The procedure may proceed as follows. In a first step, PRS/SRS and 4-step RACH parameters are configured through dedicated RRC signaling or system information. The parameter configuration in this step is the same as that in the first step for positioning in 2-step RACH. In a second step, the PRACH preamble is transmitted, at 325, from the UE to all gNBs. Some PRACH configuration indices may be reserved for NR positioning. In a third step, after receiving the preamble, the serving gNB transmits, at 330, a Random Access Response (RAR) to the UE. After that, all the gNBs start the transmission of PRSs, at 335, according to the configuration given by the higher layer parameter in the first step. In a fourth step, after detection of serving cell RAR and all of the PRSs from different gNBs, the UE sends, at 340, the PUSCH which carries the Rx-Tx time difference measurements of the UE to the serving gNB. The SRS is then transmitted, at 345, following the PUSCH slots by the number of slots specified by the SRS configuration.

All gNBs report the UE Tx-Rx time difference and gNB Tx-Rx time difference measurements to the location server. The transmission of SRS in the 4-step RACH procedure for positioning is optional. If the PRACH preamble bandwidth is large enough to satisfy the Rel-17 positioning requirement, the SRS transmission in the fourth step may be omitted, and the gNBs may use the preamble signal to measure the receive time.

Figure 4A:
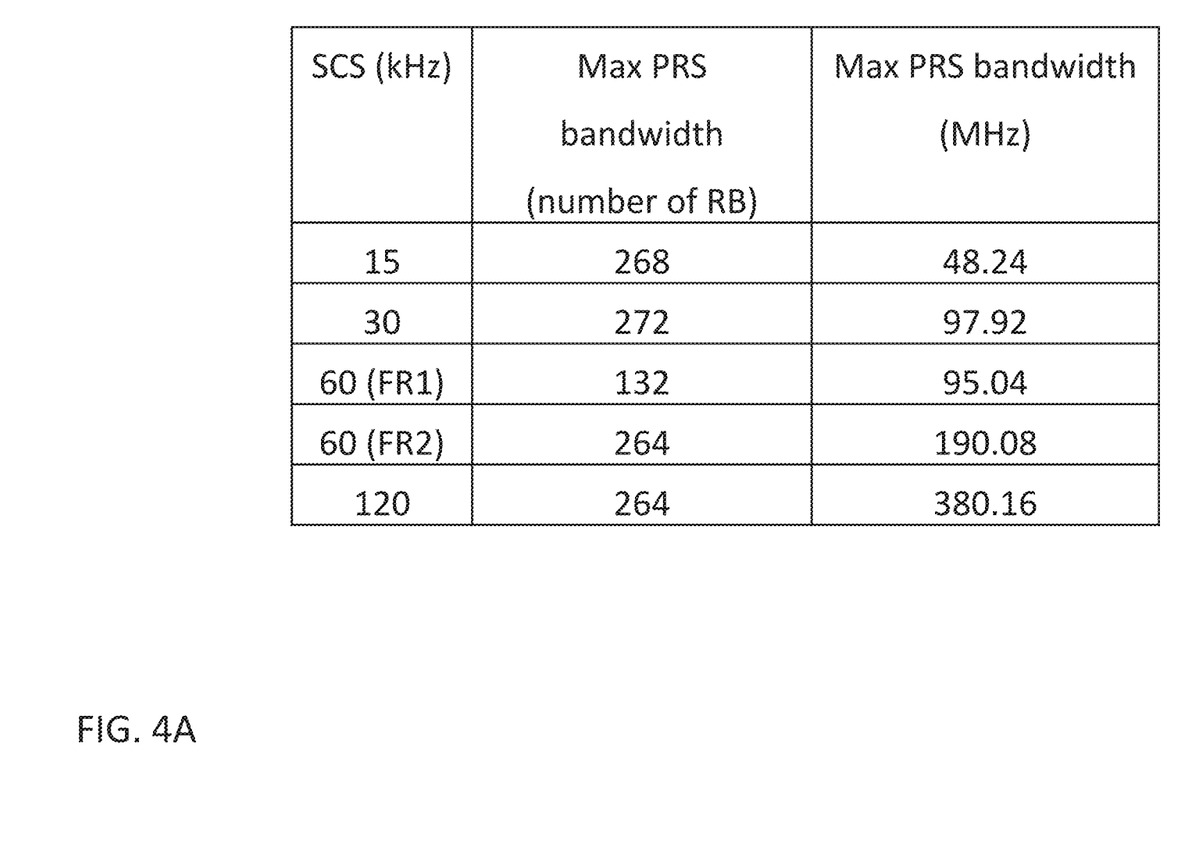
FIG. 4A is a table of parameter values, according to an embodiment of the present disclosure.

The PRS bandwidth is defined by the higher layer parameter dl-PRS-ResourceBandwidth, which has the range of 4 resource blocks (RBs) to 272 RBs with granularity of 4 RBs. On the other hand, the maximum PRS bandwidth is bounded by the maximum UE channel bandwidth for each SCS. Thus the maximum value of PRS bandwidth for each sub-carrier spacing (SCS) is given in the table of FIG. 4A. The configured bandwidth of the PRS for positioning in RRC Idle and Inactive states can be larger than the initial BWP. One option for positioning using the RACH procedure is to use the PRACH preamble for the Rx timing measurement at the gNB. For high accuracy positioning, the preamble bandwidth should be as large as possible. In Rel-16, the SRS bandwidth can range from 4 to 272 resource blocks (RBs) with granularity of 4 RBs. According to some example embodiments, the maximum preamble bandwidth may be no smaller than that of the maximum bandwidth of SRS, which is 272 RBs.

Figure 4B:
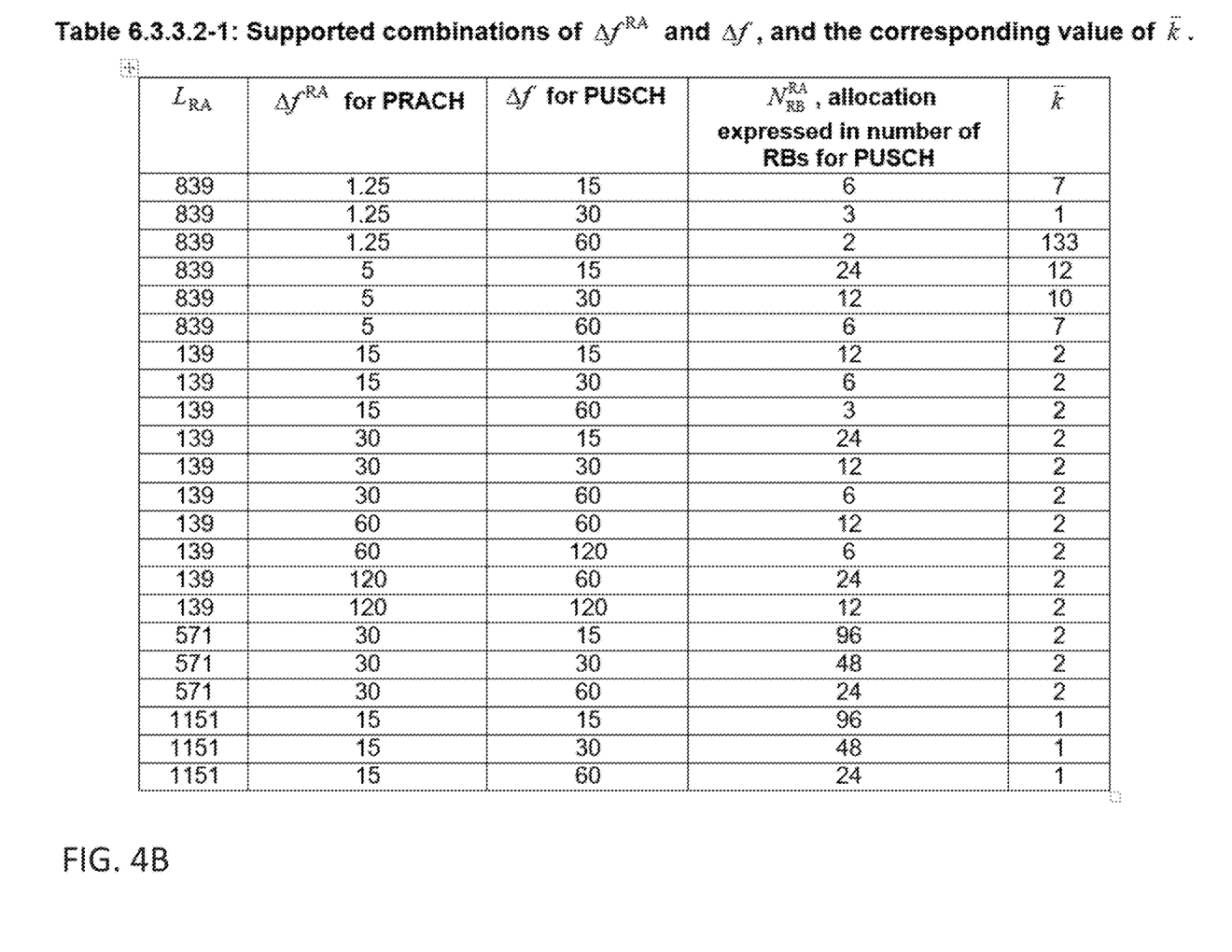
FIG. 4B is a table of parameter values, according to an embodiment of the present disclosure.

To achieve the relatively high accuracy positioning requirement specified in Rel-17 (sub-meter level position accuracy for general commercial use cases, and better than 0.2 m for IIoT use cases) an increased sequence length may be used. Random access preambles can only be transmitted in the frequency resources given by either the higher-layer parameter Msg1-FrequencyStart or the higher-layer parameter frequencyStartMsgA-PUSCH. The PRACH frequency resources $n_{RA} \in \{0, 1, \ldots, M-1\}$, where M equals the higher-layer parameter msg1-FDM or msgA-RO-FDM if configured, are numbered in increasing order within the initial uplink bandwidth part during initial access, starting from the lowest frequency. Otherwise, $n_{RA}$ are numbered in increasing order within the active uplink bandwidth part, starting from the lowest frequency. The PRACH bandwidth is determined by two parameters, (i) one of the two higher-layer parameters msg1-FDM (for 4-step RACH) and msgA-RO-FDM (for 2-step RACH) with the values of M={1, 2, 4, 8} and (ii) the number of resource blocks occupied which is given by the parameter allocation expressed in number of RBs for PUSCH (see the table of FIG. 4B).

The increased-length sequence may be used in the preamble, and the gNB may measure the time of receipt, as part of the positioning process. The sequence length X may be one that satisfies $$X = N_{SC}^{POS} \cdot \left( \frac{\Delta f^{PUSCH}}{M \cdot \Delta f^{RA}} \right), \quad (1)$$

where $N_{SC}^{POS}$ is the number of subcarriers in the SCS for PUSCH that can satisfy the positioning accuracy requirement, $\Delta f^{PUSCH}$ is the subcarrier spacing (SCS) for PUSCH transmission, $\Delta f^{RA}$ is the SCS for PRACH transmission, M is equal to the higher-layer RRC parameter msg1-FDM (for 4-step RACH) or msgA-RO-FDM (for 2-step RACH), and $$\frac{\Delta f^{PUSCH}}{M \cdot \Delta f^{RA}} \geq 1$$

satisfy the high accuracy requirement in NR positioning.

The current existing PRACH sequence lengths are 139, 571, 839, and 1151; in some embodiments, a new PRACH format with sequence length greater than 1151 is employed. In order to achieve high positioning accuracy, $\Delta f^{PUSCH}$, $\Delta f^{RA}$, and M in Equation 1 above may be chosen such that (as mentioned above)

$$\frac{\Delta f^{PUSCH}}{M \cdot \Delta f^{RA}} \geq 1.$$

One example of the possible parameters in the Equation 1 above is M=1, $\Delta f^{PUSCH} = \Delta f^{RA}$ and $N_{RB}^{POS} = 3246$; then the resulting PRACH length is $L_{RA} = 3246$. This PRACH format insures that the preamble bandwidth that can be configured by dedicated RRC if the UE is in the first scenario or by SIB1 if UE is in either the first scenario or the second scenario.

In another embodiment, the increased-length sequence is transmitted, during the procedure of positioning in RRC idle and/or inactive, in an SRS, and the gNB may measure the time of receipt, as part of the positioning process. In such an embodiment, the UE may transmit a legacy preamble in MsgA.

In some embodiments, some of the combinations of cyclic shift, root sequence index, frequency/time resource allocation configurations in 2-step RACH or in 4-step RACH may be reserved for NR positioning, i.e., for signaling to the UE that the gNB is prepared to perform positioning. Specifically, for 4-step RACH, one or multiple combinations of the configuration values for prach-RootSequenceIndex or rootSequenceIndex-BFR, zeroCorrelationZoneConfig, msg1-FrequencyStart, msg1-FDM, and prach-ConfigurationIndex may be reserved for NR positioning; for 2-step RACH, one or multiple combinations of the configuration values for msgA-PRACH-RootSequenceIndex, msgA-ZeroCorrelationZoneConfig, msgA-RO-FrequencyStart, msgA-RO-FDM, and msgA-PRACH-ConfigurationIndex may be reserved for NR positioning. For example, when the UE is in RRC Connected mode, the UE may be configured with some combination of the above parameters through RRC signaling, which indicates that positioning is to be performed. Subsequently, if the network configures the UE with the reserved parameters, it acts as a notification to the UE that the network is prepared to perform positioning, and the UE may then prepare for receiving a PRS and sending a preamble or SRS, for the purpose of positioning.

In embodiments in which an SRS is used for positioning in the RRC Idle state or in the RRC Inactive state, resources may be allocated for the SRS, e.g., both the UE and the gNB may be aware of the time at which the SRS will be transmitted, so that the UE is able to transmit the SRS at the correct time, and (if the TA is valid, which may be assumed to be the case if the SRS is transmitted during RACH) the gNB is able to decode the SRS (without a need for blind decoding). The frequency resource for SRS may be configured by RRC together with the uplink BWP. This may be accomplished in any of several different ways. In some embodiments, the SRS is transmitted after Msg3 or MsgA PUSCH transmission, and an SRS timing parameter that determines the timing of the SRS may be added into the SRS-Resource Information Element (IE) sent to the UE by the gNB, while the UE is in RRC Connected mode (in preparation for subsequent positioning while the UE in the RRC Idle state or in the RRC Inactive state). For 4-step RACH, a valid TA obtained in Msg2 may also be applied to the SRS. The SRS timing parameter may directly specify (e.g., be equal to) the time offset (e.g., in slots) between the first slot for the SRS and the last slot for the PUSCH, or it may specify this time offset indirectly (e.g., it may be an index into a table of time offsets).

In other embodiments, the SRS is transmitted after MsgB for 2-step RACH. In this case, the timing of the SRS (e.g., the indicator for the time offset between the first slot for SRS and the last slot for PUSCH in MsgA) is not needed, and the gNB may instead transmit the SRS configuration (including an indication of which resources are allocated for the SRS) to the UE in MsgB.

In some embodiments, the SRS is sent after Msg2 and before Msg3 (which is the PUSCH) for 4-step RACH, according to the SRS configuration, which is transmitted to the UE by the gNB in Msg2.

In some embodiments, the location server may initiate the location information transfer procedure in the RRC Idle state or the RRC Inactive state. This may be accomplished, for example, by transmitting the LPP Request Location Information message through the NR paging procedure. The paging channel message may include a Long Term Evolution (LTE) Positioning Protocol (LPP) Request Location Information message.

In some embodiments, the system may perform downlink positioning or uplink positioning instead of, or in addition to, multi-RTT positioning. To perform downlink positioning, the UE may receive several PRSs from several gNBs, and notify the network (e.g., the serving gNB) of the differences between the times of receipt of the PRSs. From these differences, the location of the UE may be inferred. To perform uplink positioning, the UE may send a preamble or SRS, and the location of the UE may similarly be inferred from differences in the times of receipt of the preamble or SRS at several gNBs.

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, when a second quantity is "within Y" of a first quantity X, it means that the second quantity is at least X−Y and the second quantity is at most X+Y. As used herein, when a second number is "within Y %" of a first number, it means that the second number is at least (1−Y/100) times the first number and the second number is at most (1+Y/100) times the first number. As used herein, the term "or" should be interpreted as "and/or", such that, for example, "A or B" means any one of "A" or "B" or "A and B".

The terms "processing circuit" and "means for processing" are used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein Although exemplary embodiments of a system and method for positioning in RRC Idle and Inactive states have been specifically described and illustrated herein, many modifications and variations will be apparent to those skilled in the art. Accordingly, it is to be understood that a system and method for positioning in RRC Idle and Inactive states constructed according to principles of this disclosure may be embodied other than as specifically described herein. The invention is also defined in the following claims, and equivalents thereof.

What is claimed is:

1. A method, comprising:
   receiving, by a user equipment (UE), in Idle or Inactive state, a downlink positioning reference signal (PRS);
   transmitting, by the UE, in Idle or Inactive state, a Physical Uplink Shared Channel (PUSCH) as part of a Random Access Procedure (RACH), the PUSCH carrying an estimate of a position of the UE; and
   transmitting, by the UE, in Idle or Inactive state and after transmitting the PUSCH, a positioning sounding reference signal (SRS) as an uplink reference signal following a last slot of the PUSCH by a number of slots specified by an SRS timing parameter.

2. The method of claim 1, further comprising:
   receiving the SRS timing parameter from a network; and
   wherein the transmitting of the positioning SRS comprises transmitting the positioning SRS in a slot separated from the last slot of the PUSCH by the specified number of slots.

3. The method of claim 1, further comprising transmitting, by the UE, in Idle or Inactive state, to a network, a time difference between the receiving, by the UE, of the downlink PRS and the transmitting, by the UE, of the uplink reference signal.

4. The method of claim 1, further comprising, receiving, by the UE, from a network, before the transmitting of the uplink reference signal, a Physical Random Access Channel configuration index value (PRACH index value), the PRACH index value being reserved for informing the UE of the network being ready to receive the uplink reference signal.

5. The method of claim 1, further comprising, receiving, by the UE, before the transmitting of the uplink reference signal, a paging channel message, the paging channel message comprising a Long Term Evolution (LTE) Positioning Protocol (LPP) Request Location Information message.

6. A system, comprising:
   a user equipment (UE), the UE comprising:
   a processing circuit; and
   a radio,
   the processing circuit being configured to transmit, in Idle or Inactive state, an uplink reference signal, the uplink reference signal being a Physical Random Access Channel (PRACH) preamble with sequence length greater than 1151, the sequence length greater than 1151 based on a number of subcarriers in a subcarrier spacing (SCS) for Physical Uplink Shared Channel (PUSCH) transmission and a ratio of the SCS for PUSCH transmission to a SCS for PRACH transmission.

7. The system of claim 6, wherein the sequence length greater than 1151 is a length X satisfying $$X = N_{SC}^{POS} \cdot \left( \frac{\Delta f^{PUSCH}}{M \cdot \Delta f^{RA}} \right),$$

wherein:
$N_{SC}^{POS}$ is the number of subcarriers in a subcarrier spacing (SCS) for PUSCH transmission that satisfy 3$^{rd}$ Generation Partnership Project (3GPP) 5G New Radio (NR) Rel-17 positioning accuracy requirement,
$\Delta f^{PUSCH}$ is the SCS for PUSCH transmission,
$\Delta f^{RA}$ is the SCS for PRACH transmission,
M is equal to a higher-layer parameter msg1-frequency division multiplexing (msg1-FDM) or the higher-layer parameter msgA-RACH occasion-FDM (msgA-RO-FDM), and $$\frac{\Delta f^{PUSCH}}{M \cdot \Delta f^{RA}} \geq 1.$$

8. The system of claim 6, wherein the transmitting of the uplink reference signal comprises transmitting the uplink reference signal in a random access channel (RACH) MsgA.

9. The system of claim 6, wherein the transmitting of the uplink reference signal comprises transmitting the uplink reference signal in a random access channel (RACH) Msg1.

10. The system of claim 6, wherein the processing circuit is further configured to receive, from a network, before the transmitting of the uplink reference signal,
   a first set of configuration values for prach-RootSequenceIndex or rootSequenceIndex-beam failure recovery (rootSequenceIndex-BFR), zero CorrelationZoneConfig, msg1-FrequencyStart, msg1-frequency division multiplexing (msg1-FDM), and prach-ConfigurationIndex; or
   a second set of configuration values for msgA-PRACH-RootSequenceIndex, msgA-Zero CorrelationZoneConfig, msgA-RACH occasion-FrequencyStart (msgA-RO-FrequencyStart), msgA-RO-FDM, and msgA-PRACH-ConfigurationIndex, the first or the second set of configuration values being reserved for informing the UE of the network being ready to receive the uplink reference signal.

11. The system of claim 6, wherein the processing circuit is further configured to receive, before the transmitting of the uplink reference signal, a paging channel message, the paging channel message comprising a Long Term Evolution (LTE) Positioning Protocol (LPP) Request Location Information message.

12. A system, comprising:
a user equipment (UE), the UE comprising:
a processing circuit; and
a radio,
the processing circuit being configured to:
transmit, by the UE, in Idle or Inactive state, a Physical Uplink Shared Channel (PUSCH) as part of a Random Access Procedure (RACH), the PUSCH carrying an estimate of a position of the UE; and
transmit, by the UE, in Idle or Inactive state and after transmitting the PUSCH, a positioning sounding reference signal (SRS) as an uplink reference signal following a last slot of the PUSCH by a number of slots specified by an SRS timing parameter.

13. The system of claim 12, wherein the processing circuit is further configured to:
receive the SRS timing parameter from a network; and
wherein the positioning SRS is transmitted in a slot separated from the last slot of the PUSCH by the specified number of slots.

* * * * *